UNITED STATES PATENT OFFICE

2,966,499

OXIDATION OF CHOLIC ACID WITH CHLORINE

David F. Hinkley, Plainfield, and Bert Singleton, Elizabeth, N.J., assignors to Merck & Co., Inc., Rahway, N.J., a corporation of New Jersey No Drawing. Filed Apr. 9, 1958, Ser. No. 727,243

4 Claims. (Cl. 260—397.1)

This invention relates to a novel process for producing dehydrocholic acid and more particularly to a process in which dehydrocholic acid is produced by the oxidation of 3,7,12-trihydroxycholanic acid.

Dehydrocholic acid, which is also known as 3,7,12-triketocholanic acid, is a choleretic. It is useful in the treatment of hepatic and biliary tract diseases, such as chronic cholecystitis and cholangitis.

Dehydrocholic acid has been previously produced from cholic acid (3,7,12-trihydroxycholanic acid) by the action of various oxidizing agents such as chromic anhydride, N-bromosuccinimide, and alkali metal hypochlorites. A superior oxidizing agent is chlorine.

Dehydrocholic acid can be produced in good yield and high purity by oxidizing either crude or refined cholic acid with approximately the theoretical quantity or a slight excess of chlorine in an acidic organic solvent medium. Solvents used heretofore include glacial acetic acid and acidified acetone. The reaction is highly exothermic, liberating 330,000 calories per mole. Control of the reaction temperature is maintained by adjusting the rate at which chlorine is contacted with the solution of cholic acid. The reaction temperature is generally maintained below 30° C., as there is a loss in both yield and purity at higher temperatures. A further complication is that, even at temperatures below 30° C., side reactions occur between the steroid, chlorine, and solvents used heretofore, such as acetone and glacial acetic acid. For example, there is a marked loss of yield of dehydrocholic acid when the reaction is carried out over a period exceeding one hour at 20° C. in acetone. As the reaction time is lengthened, the yield drops off rapidly. Production of dehydrocholic acid by oxidation of cholic acid with chlorine in the solvent media heretofore known is not feasible on a commercial scale, as it is both impractical and costly to build a reactor with sufficient heat exchange surface to dissipate the large amount of heat liberated during the reaction.

According to the present invention it has been found that cholic acid can be oxidized efficiently to dehydrocholic acid with chlorine in an inert solvent. The use of an inert solvent makes it possible to produce dehydrocholic acid in high yield and purity without side reactions in much less expensive apparatus than would be required with the solvents heretofore used. Suitable inert solvents according to the present invention include ethyl acetate, pyridine, and dimethylformamide. Ethyl acetate is a preferred solvent.

The reaction according to the present invention may be represented by the following equation:

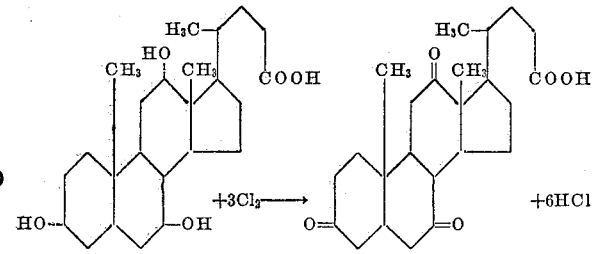

Either crude or pure cholic acid can be used as a starting material. When crude cholic acid is used, the resulting crude dehydrocholic acid can be purified easily by conventional procedures.

In addition to cholic acid and an inert solvent, the reaction medium also contains an acidifying agent such as acetic or sulfuric acid, and water. It is also desirable to include sodium acetate or other Lewis base which is capable of reacting with the hydrochloric acid formed during the reaction, since unneutralized hydrochloric acid promotes side reactions.

The reaction according to the present invention is carried out at room temperature, or below. The temperature should be maintained below 30° C., as there is a loss in both yield and purity at higher temperatures. A convenient operating temperature has been found to be about 15° to 20° C. However, lower temperatures, as low as 0° C., are suitable.

Chlorine gas is contacted with the solution of cholic acid, while the temperature is maintained in the range previously indicated. Contact may be made by bubbling the chlorine through a pool of the solution or by passing chlorine and the solution counter-current through a cooled absorption column or by other suitable means recognized in the art. The reaction can be conducted successfully over a time interval ranging from 10 minutes to about 24 hours. The optimum reaction time is determined primarily by the rate at which the heat of reaction can be dissipated. The amount of chlorine gas ranges from the stoichiometric quantity to an excess of about 50%. Excellent results are obtained with about 20% to 25% excess chlorine.

The product dehydrocholic acid may be recovered from solution by dilution of the solvent. It is convenient to add sufficient water and to evaporate the solvent so that a flowable slurry of dehydrocholic acid remains after the volatile solvent has been evaporated. The evaporation of ethyl acetate may be conducted either at atmospheric pressure with temperatures ranging up to about 100° C. or at reduced pressure, in which case it is possible to maintain a maximum evaporation temperature as low as 40° C. The product may then be purified by recrystallization from a suitable solvent such as acetone, isopropanol, or the like.

This invention will now be illustrated in detail with reference to the following example:

EXAMPLE

*A. Oxidation of cholic acid*

A solution, consisting of 15.40 g. of cholic acid and 18.75 g. of anhydrous sodium acetate in a solvent mixture of 20 ml. of ethyl acetate, 30 ml. of glacial acetic acid, and 30 ml. of water, was prepared. This solution was placed in a three-necked, 500-ml. flask equipped with mechanical stirrer, thermometer, and a gas-delivery tube extending beneath the liquid surface, and cooled to 20° C. Chlorine gas was bubbled into the solution with vigorous stirring while the reaction temperature was maintained at 20° C. The chlorine was delivered at a constant rate of about 2.5 g. per hour over a four-hour period. The total amount of chlorine gas was 9.80 g. which corresponds to about 3.68 moles per mole of cholic acid, or approximately a 23% excess. The solution temperature was maintained in the range of 16° to 20° C. during the entire addition of chlorine. Initially the cholic acid solution was very dark-colored. As the reaction progressed, the solution became pale yellow and a precipitate of sodium chloride deposited. A considerable amount of product and sodium chloride precipitated during the latter stages of the reaction so that the final reaction mixture was a heavy slurry which was difficult to stir. After the addition of chlorine was complete, the slurry was aged one hour with stirring at 20° C. The excess chlorine was then discharged by dropwise addition of 10% aqueous sodium sulfite until the solution gave a negative test to starch-iodide paper. The semi-crystalline slurry was then diluted with water to raise the total volume to 225 ml. The water was added dropwise with stirring over a one-hour period. The ethyl acetate was then distilled off by heating with stirring to 90° C.; distillation occurred in the range of 65° to 88° C. The resulting crystalline slurry was cooled to below 70° C. and filtered through a 400 cc., sintered-glass funnel of medium porosity. The filter cake was washed until the filtrate gave a negative halide test with silver nitrate solution and then was sucked partially dry on the funnel. Drying was completed in a drier at 110° C. for three hours. The product was crude pale tan dehydrocholic acid. Yield 14.3 (95%); M.P. 225° to 231° C.

B. *Purification of dehydrocholic acid*

To a ¾" diameter electrically-heated chromatographic column, packed with 6.67 g. of charcoal ("Nuchar C") with 1" layers of sea sand at either end, 75 ml. of acetone was added to wet the carbon. The column was heated to 40° C., and 25 ml. of acetone was drained off. A solution of 20 g. of dry crude dehydrocholic acid in 500 cc. of acetone was poured into a reservoir atop the column and maintained in this reservoir at 40° C. This solution was then allowed to drop through the column at a constant rate over a three-hour period. The column was then washed with 250 ml. of acetone flowing through the column at a constant rate over a one-hour period at a temperature of 40° C. The column effluent and wash acetone were combined and concentrated to a residual volume of about 100 ml. which resulted in the formation of a thick slurry. The slurry was cooled with stirring at 0° to 5° C. and aged for 30 minutes at this temperature. The slurry was filtered and the filter cake washed with cold acetone. The filter cake of U.S.P. dehydrocholic acid was sucked partially dry on the filter and then dried at 110° C. for three hours. Yield 15 g. to 17 g. (75% to 85%).

A second crop of crystals was obtained from the combined filtrate and wash liquid from the first crop filtration. This mixture, which initially had a volume of about 100 ml., was concentrated to 20 ml. at atmospheric pressure. Ten milliliters of water was added to the solution and 10 ml. of acetone mixed with a small amount of water distilled off. The residual thick slurry of dehydrocholic acid was cooled to 0° to 5° C., aged at this temperature with stirring for 30 minutes, and filtered. The filter cake was washed with acetone at 0° C., partially dried by suction on the filter, and then dried for three hours at 110° C. Yield 1 to 2 g. (5% to 10%).

While this invention has been described with respect to specific embodiments thereof, it is understood that these specific embodiments are given by way of illustration and not limitation.

What is claimed is:

1. A process for oxidizing cholic acid to dehydrocholic acid, which comprises contacting cholic acid with an excess of chlorine in an acidic organic solvent medium, comprising ethyl acetate, sodium acetate, and acetic acid, and recovering the dehydrocholic acid.

2. A process according to claim 1, wherein the reaction is conducted at a temperature below about 30° C.

3. In the process for the oxidation of cholic acid to dehydrocholic acid comprising contacting cholic acid with an excess of chlorine in an acidic organic solvent medium comprising sodium acetate, the improvement which comprises conducting the reaction in the presence of ethyl acetate.

4. The process according to claim 3, wherein the reaction is conducted at a temperature below about 30° C.

References Cited in the file of this patent

UNITED STATES PATENTS

| | | |
|---|---|---|
| 2,576,728 | Servis et al. | Nov. 27, 1951 |
| 2,651,642 | Sifferd | Sept. 8, 1953 |
| 2,746,977 | Sifferd et al. | May 22, 1956 |